(12) United States Patent
Zhang et al.

(10) Patent No.: US 10,721,471 B2
(45) Date of Patent: Jul. 21, 2020

(54) DEEP LEARNING BASED QUANTIZATION PARAMETER ESTIMATION FOR VIDEO ENCODING

(71) Applicant: Intel Corporation, Santa Clara, CA (US)

(72) Inventors: Ximin Zhang, San Jose, CA (US); Bin Zhu, San Jose, CA (US); Sang-Hee Lee, San Jose, CA (US); Qing Li, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 52 days.

(21) Appl. No.: 15/794,938

(22) Filed: Oct. 26, 2017

(65) Prior Publication Data

US 2019/0132591 A1 May 2, 2019

(51) Int. Cl.
| | |
|---|---|
| *H04N 19/124* | (2014.01) |
| *H04N 19/167* | (2014.01) |
| *G06N 3/04* | (2006.01) |
| *H04N 19/184* | (2014.01) |
| *G06N 3/10* | (2006.01) |
| *H04N 19/59* | (2014.01) |
| *G06N 3/08* | (2006.01) |
| *H04N 19/159* | (2014.01) |
| *H04N 19/172* | (2014.01) |
| *H04N 19/136* | (2014.01) |

(Continued)

(52) U.S. Cl.
CPC ............. *H04N 19/124* (2014.11); *G06N 3/04* (2013.01); *G06N 3/08* (2013.01); *G06N 3/10* (2013.01); *H04N 19/136* (2014.11); *H04N 19/159* (2014.11); *H04N 19/167* (2014.11); *H04N 19/172* (2014.11); *H04N 19/184* (2014.11); *H04N 19/59* (2014.11); *G06N 5/003* (2013.01); *G06N 20/20* (2019.01)

(58) Field of Classification Search
CPC ...... H04N 19/16; H04N 19/124; H04N 19/59; H04N 19/184; G06N 3/04; G06N 3/10
See application file for complete search history.

(56) References Cited

U.S. PATENT DOCUMENTS

| | | | |
|---|---|---|---|
| 2006/0203907 A1* | 9/2006 | Yang | H04N 19/159 375/240.03 |
| 2007/0237237 A1* | 10/2007 | Chang | H04N 19/61 375/240.21 |

(Continued)

OTHER PUBLICATIONS

Youtube. Machine learning for video transcoding. https://youtube-eng.googleblog.com/2016/05/machine-learning-for-video-transcoding.html, 2016. 10 pages.

(Continued)

*Primary Examiner* — Dave Czekaj
*Assistant Examiner* — Berteau Joisil
(74) *Attorney, Agent, or Firm* — Green, Howard & Mughal LLP.

(57) ABSTRACT

Techniques related to quantization parameter estimation for video coding are discussed. Such techniques may include generating features using a picture of input video received for encoding and applying a neural network to a feature vector including the features, a target bitrate, and a resolution of the picture to generate an estimated quantization parameter for encoding the picture.

22 Claims, 8 Drawing Sheets

(51) Int. Cl.
  *G06N 20/20* (2019.01)
  *G06N 5/00* (2006.01)

(56) References Cited

U.S. PATENT DOCUMENTS

| | | | | |
|---|---|---|---|---|
| 2012/0294369 | A1* | 11/2012 | Bhagavathy | H04N 19/119 375/240.16 |
| 2016/0088298 | A1* | 3/2016 | Zhang | H04N 19/146 375/240.03 |
| 2018/0075618 | A1* | 3/2018 | Lai | H04N 13/275 |
| 2019/0020871 | A1* | 1/2019 | Xu | H04N 19/124 |

OTHER PUBLICATIONS

Escribano, G. et al., "Video Encoding and Transcoding Using Machine Learning", International Workshop on Multimedia Data Mining, Knowledge Discovery & Data Mining, 2008, pp. 53-62 (10 pages).

He, K. et al., "Deep Residual Learning for Image Recognition", IEEE Conference on Computer Vision and Pattern Recognition, 2016, 9 pages.

Kim, H. "Deep Convolutional Neural Models for Picture Quality Prediction", Journal of Latex Class Files, vol. 14, No. 8, Aug. 2015, 20 pages.

Krizhevsky, A. et al., "ImageNet Classification with Deep Convolutional Neural Networks", In Advances in Neural Information Processing systems (NIPS), 2012, pp. 1-9 (9 pages).

Lampert, C. et al., "Machine Learning for Video Compression: Macroblock Mode Decision", 18th International Conference on Pattern Recognition (ICPR'06), 2006, 5 pages.

Li, Z. et al., "Toward a Practical Perceptual Video Quality Metric", https://medium.com/netflix-techblog/toward-a-practical-perceptual-video-quality-metric-653f208b9652. 2016, 23 pages.

Lin, R. et al., "Deep Convolutional Neural Network for Decompressed Video Enhancement", Data Compression Conference (DCC), 2016, p. 617 (1 page).

Santurkar, "Generative Compression", https://arxiv.org/abs/1703.01467, Jun. 2017, 10 pages.

Theis, L. "Lossy image compression with compressive autoencoders", In International Conference on Learning Representations, 2017, 19 pages.

Zhu, J. et al., "Generative visual manipulation on the natural image manifold", In European Conference on Computer Vision, 2016, 16 pages.

* cited by examiner

DEEP LEARNING BASED QUANTIZATION PARAMETER ESTIMATION FOR VIDEO ENCODING

BACKGROUND

In compression/decompression (codec) systems, compression efficiency and video quality are important performance criteria. Visual quality is an important aspect of the user experience in many video applications and compression efficiency impacts the amount of memory storage needed to store video files and/or the amount of bandwidth needed to transmit and/or stream video content. For example, a video encoder compresses video information so that more information can be sent over a given bandwidth or stored in a given memory space or the like. The compressed signal or data may then be decoded via a decoder that decodes or decompresses the signal or data for display to a user. In most implementations, higher visual quality with greater compression is desirable.

In the context of video encoding, bit rate control (BRC) is a key factor in video quality. Given a target bitrate, BRC adjusts the quantization parameter (QP) value of each frame to control the number of bits generated during compression of the frames. One of the challenges in BRC is handling scene change scenarios where such scene change frames (e.g., a frame at the beginning of a scene change) are typically encoded as I frames. Since a scene change frame has no correlation with previous frames, it is extremely difficult to predict its QP. If the predicted QP value is off from the desired QP value, the result is poor quality of the remaining frames in the same group of pictures (GOP) or beyond and possibly video buffer verifier (VBV) buffer overflow/underflow. Typical BRC techniques include heuristic and empirical approaches as well as multiple pass approaches where an input frame is encoded multiple times with the QP prediction being fine tuned across each pass. Such heuristic and empirical approaches provide relatively low computation complexity but do not accurately predict QP, resulting in an undesirably large gap between actual and target bitrates. Multiple pass techniques are more accurate but have undesirably large computation costs and durations making them unsuitable for real-time and low power implementations.

It may be advantageous to improve QP selection particularly for scene change frames or I-frames to provide enhanced compression efficiency and/or video quality. It is with respect to these and other considerations that the present improvements have been needed. Such improvements may become critical as the desire to compress and transmit video data becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
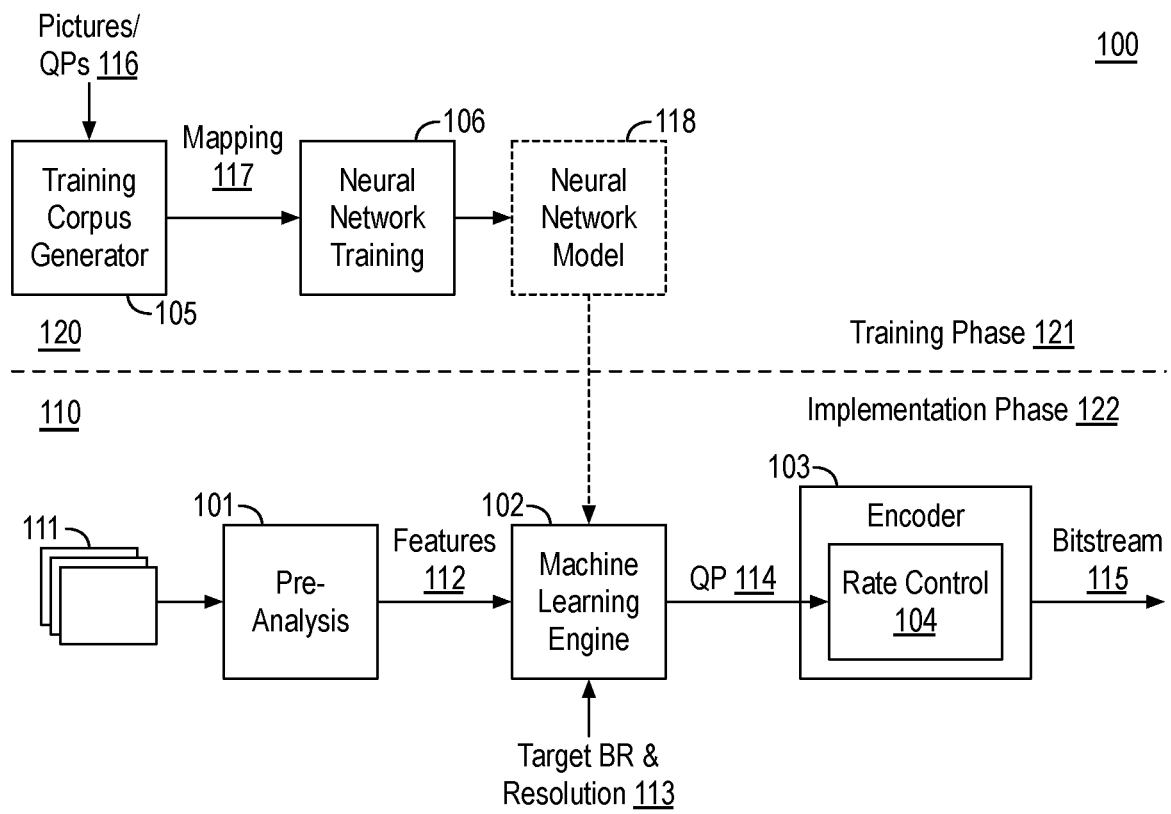
FIG. 1 is an illustrative diagram of an example system for providing video coding.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, apparatuses, computing platforms, and articles are described herein related to video coding and, in particular, to quantization parameter prediction.

As described above, in modern video coding, quantization parameter (QP) selection for bit rate control is an important feature for improved efficiency and/or video quality. The techniques discussed herein provide for QP for video encoding rate control using a pre-trained neutral network (NN) to predict the QP value. In an embodiment, features extracted from a picture (or video frame) of input video together with other parameters such as a target bitrate for the picture and a resolution of the picture are provided as the inputs (e.g., as a feature vector) to the NN. The pretrained NN generates an estimated quantization parameter using the discussed feature vector, which is then used for encoding the picture to generate a bitstream. The discussed techniques provide a framework for using deep learning for QP estimation and integration of the deep learning framework into a video encoding rate control pipe line. As discussed herein, the discussed features extracted from the input picture are selected to provide an advantageous combination of features for high quality QP selection and resultant video coding. For example, features including a grid based combination of prediction distortion and picture variance provide along with target bitrate and picture resolution provide features that result in accurate QP selection with low computational requirements. Such techniques provide high accuracy QP prediction (e.g., about 95% accurate as compared to exhaustive QP searches) that are as accurate as multiple pass techniques. Furthermore, such techniques are highly accurate in scene change scenarios where no information correlation to previous frames is available.

FIG. 1 is an illustrative diagram of an example system 100 for providing video coding, arranged in accordance with at least some implementations of the present disclosure. As shown in FIG. 1, system 100 may include a pre-analysis module 101, a machine learning engine 102, and an encoder 103 including a rate control module 104 implemented by a device 110 such that device 110 may provide for an implementation phase 122 (e.g., for encoding input video 111 to generate a bitstream 115). Furthermore, system 100 may include a training corpus generator 105 and a neural network training module 106 to generate a neural network model 118 implemented by a device 120 such that device 120 may provide for a training phase 121 (e.g., for generating neural network model 118 using input pictures and QPs 116. In some embodiments, device 110 and device 120 are physically separate devices. In other embodiments, device 110 and device 120 are provided in the same physical device.

As shown, device 110 of system 100 may receive input video 111 for coding and device 110 may provide video compression to generate a bitstream 115 such that device 110 may be a video encoder implemented via a computer or computing device or the like. As discussed further herein, device 110 may select a QP 114 for a picture of input video 111 and device 110 may encode the picture of input video 111 via encoder 103 to generate compressed video data as a portion of bitstream 115. Bitstream 115 may be any suitable bitstream such as a standards compliant bitstream. For example, bitstream 115 may be H.264/MPEG-4 Advanced Video Coding (AVC) standards compliant, H.265 High Efficiency Video Coding (HEVC) standards compliant, VP9 standards compliant, etc. Device 110 and/or device 120 may be implemented via any suitable device such as, for example, a personal computer, a laptop computer, a tablet, a phablet, a smart phone, a digital camera, a gaming console, a wearable device, an all-in-one device, a two-in-one device, or the like or a platform such as a mobile platform or the like. For example, as used herein, a system, device, computer, or computing device may include any such device or platform.

Device 110 may include other modules or components not shown for the sake of clarity of presentation. For example, encoder 103 of device 110 may include a partition module, a transform module, a quantization module, an intra prediction module, a motion estimation module, a motion compensation module, a scanning module, an entropy encode module, etc. Furthermore, encoder 103 may include a local decode loop including an inverse quantization module, an inverse transform module, and an adder for combining reconstructed residual blocks with reference blocks, a deblock filtering module, a sample adaptive offset (SAO) filtering module, etc. Such modules and the operations associated therewith are known to those of skill in the art and are not discussed further herein for the sake of clarity in presenting the described techniques.

As discussed, device 110 receives input video 111. Input video 111 may include any suitable video frames, video pictures, sequence of video frames, group of pictures, groups of pictures, video data, or the like in any suitable resolution. For example, the video may be video graphics array (VGA), high definition (HD), Full-HD (e.g., 1080p), 4K resolution video, 5K resolution video, or the like, and the video may include any number of video frames, sequences of video frames, pictures, groups of pictures, or the like. Techniques discussed herein are discussed with respect to pictures and blocks for the sake of clarity of presentation. However, such pictures may be characterized as frames, video frames, sequences of frames, video sequences, or the like, and such blocks may be characterized as coding units, coding blocks, macroblocks, sub-units, sub-blocks, or the like. For example, a picture or frame of color video data may include a luminance plane or component and two chrominance planes or components at the same or different resolutions with respect to the luminance plane. Input video 111 may include pictures or frames that may be divided into blocks of any size, which contain data corresponding to, for example, M×N blocks of pixels. Such blocks may include data from one or more planes or color channels of pixel data. As used herein, the term block may include macroblocks, coding units, or the like of any suitable sizes. As will be appreciated such blocks may also be divided into sub-blocks for prediction, transform, or the like.

Figure 2:
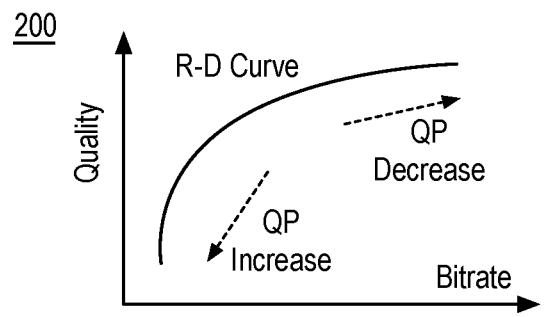
FIG. 2 illustrates an example rate-distortion curve.

FIG. 2 illustrates an example rate-distortion curve 200, arranged in accordance with at least some implementations of the present disclosure. In bit rate control, the implemented techniques attempt to provide, for a given target bitrate, a QP value in each video picture that controls the encoded bits on each picture to get the best video quality and match the target bitrate as closely as possible. Larger QP values provide lower bitrates and correspondingly higher amounts of distortion (i.e., lower visual quality). Conversely, lower QP values provide larger bitrates and lower amounts of distortion (i.e., higher visual quality). The relationship of such variables is illustrated with rate-distortion curve 200 (R-D Curve). Bit rate control techniques attempt to adjust QP to achieve a location on rate-distortion curve 200 corresponding to the target bit rate such that the actual bitrate is as close to the target as possible. Therefore, it is desirable to predict an accurate QP to match with the target bit rate closely in encode implementations.

Returning to FIG. 1, as shown, pre-analysis module 101 of device 110 receives input video 111, which includes multiple video pictures. As shown, for a particular picture of input video 111, pre-analysis module 101 extracts features 112. Features 112 may be characterized as picture features, picture region features, complexity features, image complexity features, or the like. For example, the particular picture of input video 111 may be an I-picture or scene change picture or the like. In an embodiment, QP values for I-pictures and scene change pictures of input video 111 may be determined as discussed with respect to pre-analysis module 101 and machine learning engine 102 while QP values for other pictures (i.e., P-pictures, B-pictures, etc.) may be generated by rate control module 104 using any suitable technique or techniques. In an embodiment, QP values for all picture types may be determined as discussed with respect to pre-analysis module 101 and machine learning engine 102. As shown, features 112 and target bitrate (BR) and resolution 113 are provided to machine learning engine 102 for the generation of QP 114. The target bitrate of target bitrate and resolution 113 may be any suitable value such as a target number of bits for the encode of the particular picture of input video 111 or the like and the target bitrate may be generated using any suitable technique or techniques. In an embodiment, the target bitrate is generated by an application invoking encode, selected by a user, or the like. Furthermore, the resolution of target bitrate and resolution 113 may be any suitable value or indicator of the resolution of the particular picture of input video 111 to be encoded and the resolution may be determined using any suitable technique or techniques. In an embodiment, the resolution indicates the number of pixels in the particular picture of input video 111. In an embodiment, the resolution is provided by an indicator corresponding the number of pixels, a width and height of the picture, etc.

As shown, features 112 and target bitrate and resolution 113 are provided to machine learning engine 102 for the generation of QP 114. Machine learning engine 102 may implement any suitable machine learning algorithm such as a random forest classifier, a vector machine, a deep learning model, an artificial neural network, a deep neural network, or the like. In an embodiment, machine learning engine 102 implements a deep neural network including an input layer (to receive a feature vector), multiple hidden layers (e.g., interconnected hidden layers), and an output layer (to provide a resultant QP value) as discussed with respect to FIG. 5. As is discussed further herein, machine learning engine 102 implements a pretrained random forest classifier, vector machine, deep learning model, artificial neural network, deep neural network, or convolutional neural network. Such pretraining techniques are discussed further herein below. Furthermore, corresponding to the machine learning model implemented by machine learning engine 102, device 120 implements a suitable training model for the implemented machine learning model. In the illustrated embodiment, machine learning engine 102 implements neural network model 118, which was trained by neural network training module 106. However, the implementation of devices 110, 120 are not limited to neural network implementations. In other embodiments, machine learning engine 102 of device 110 implements a random forest classifier trained by a random forest classifier training module of device 120, a vector machine trained by a vector machine training module of device 120, a deep learning model trained by a deep learning model training module of device 120, etc.

Figure 3:
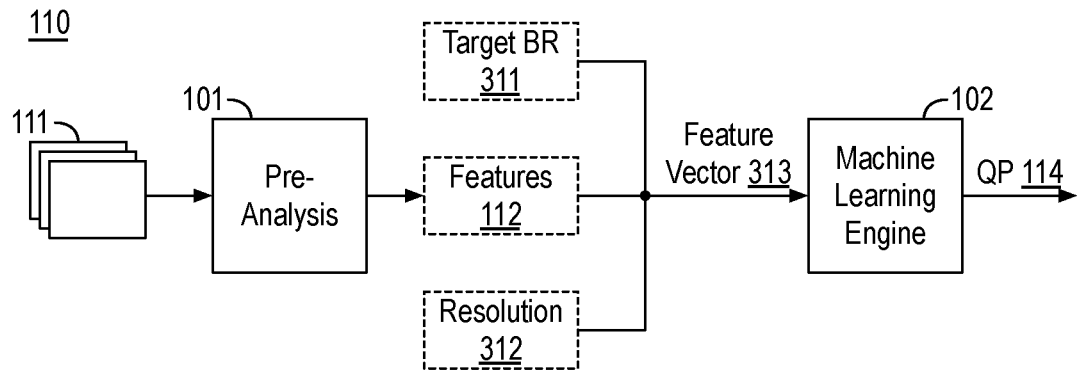
FIG. 3 is an illustrative diagram of an example portion of device for generating a quantization parameter using a machine learning engine.

FIG. 3 is an illustrative diagram of an example portion of device 110 for generating a quantization parameter using a machine learning engine, arranged in accordance with at least some implementations of the present disclosure. As shown in FIG. 3, pre-analysis module 101, based on a particular picture of input video 111, generates features 112 for use by machine learning engine 102 in determining QP 114 for the particular picture of input video 111. Features 112 may be any suitable features generated using any suitable technique or techniques. For example, features 112 may be those features in input pictures that provide an efficient mapping to precisely predict a QP without use of an entire encode pipeline. As is discussed below, machine learning engine 102 implements a pretrained model such as a deep neural network (i.e., deep learning neural network) that is trained to automatically build up features residing in the parameters of the neural network (NN) or deep neural network (DNN) based on a training set or corpus as discussed herein. The techniques discussed with respect to device 110 use the pretrained model such a neural network to automatically generate a QP for an input picture based on features extracted from the input picture. For example, the techniques discussed herein may include two stages or phases: training phase 121 (e.g., an offline training stage) to build up the training data (e.g., ground truth data) and train the model (e.g., the NN) and an implementation phase to implement the trained model to predict QP in an encode pipeline or work flow as shown with respect to FIG. 1. For example, pre-analysis module 101, a machine learning engine 102, and encoder 103 provide an encode pipeline to generate bitstream 114 based on input video 111 using feature extraction and machine learning.

As discussed, features 112 may be any features that provide an efficient mapping to precisely predict a QP. Furthermore, such features are used both during training to train a model and during implementation to implement the model. In an embodiment, generating features 112 includes downsampling particular picture of input video 111, applying a grid to the downsampled picture to divide it into multiple picture regions, and extracting one or more features from each picture region. As shown, features 112 may be combined with target bit rate (BR) 311 and resolution 312 (e.g., from target bitrate and resolution 113 as discussed above) to generate a feature vector 313, which may be provided to machine learning engine 102 for the generation of QP 114.

Figure 4:
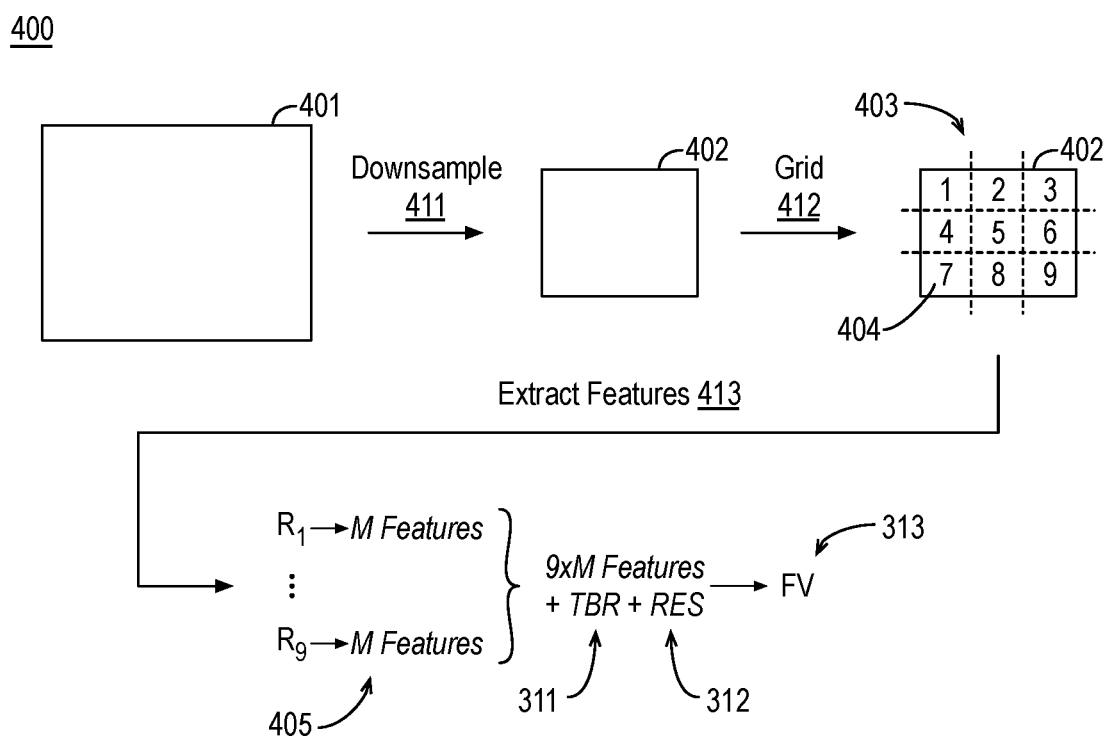
FIG. 4 is an illustrative diagram of an example feature extraction from a video picture.

FIG. 4 is an illustrative diagram of an example feature extraction 400 from a video picture, arranged in accordance with at least some implementations of the present disclosure. As shown in FIG. 3, in some embodiments, a picture 401 of input video may be received for processing. For example, feature extraction 400 may be performed by pre-analysis module 101. Picture 401 may be any suitable picture of input video as discussed herein such as an I-picture or a scene change picture or the like. As shown, picture 401 may be downsampled by downsampling operation 411 to generate a downsampled picture 402. Downsampling operation 411 may be performed using any suitable technique or techniques such as uniform downsampling by any ratio such as 2× downsampling, 4× downsampling, or 8× downsampling.

As shown, downsampled picture 402 may be divided into a grid 403 of picture regions 404 via grid operation 412. Such picture regions 404 are labeled as image regions 1-9 in FIG. 4. Downsampled picture 402 may be divided or segmented into any number of picture regions 404 such as 9 (as shown), 15, 20, or more image regions. As shown, grid 403 may divide downsampled picture 402 into picture regions 404 such that picture regions 404 are non-overlapping and collectively cover the entirety of downsampled picture 402. However, downsampled picture 402 may be divided into picture regions 404 using any suitable technique or techniques. Furthermore, although discussed with respect to downsampled picture 402, in some embodiments, picture 401 may be divided into image regions and features may be extracted therefrom.

With continued reference to FIG. 4, features 405 may be extracted from downsampled picture 402 such that one or more features 405 are extracted for each of picture regions 404 via feature extraction operation 413. For example, for each picture region of picture regions 404, one or more features 405 (e.g., 1 to M features) are extracted. Each feature may be extracted from each picture region using any suitable technique or techniques. In an embodiment, a pixel variance for each picture region is determined as a feature of the picture region. The pixel variance may be determined using any suitable technique or techniques. In an embodiment, the pixel variance is determined as a variance of the luma values for each pixel of the downsampled region. For example, the pixel variance measures the spread from an average of pixel value (e.g., luma value) of the pixel values within the region.

In an embodiment, an intra prediction distortion value or measure for each picture region is determined as a feature of the picture region. For example, intra prediction may be performed on the picture regions 404 and a resultant measurement of average picture distortion for the region may be used as a feature for the picture region. The intra prediction may be performed using any suitable technique or techniques. In an embodiment, the intra prediction is high level intra prediction as it is performed on downsampled picture regions. In an embodiment, the intra prediction is a limited intra prediction that uses only a subset of intra prediction modes available during encode. For example, with reference to FIG. 1 encoder 103 may perform intra prediction that searches all available intra prediction modes available in the implementation of a standards based codec such as AVC or HEVC. The intra prediction performed by pre-analysis module 101 in contrast may limit the number of intra prediction modes to just a subset of such directions. In an embodiment, pre-analysis module 101 implements only DC, vertical, and horizontal intra prediction. In an embodiment, pre-analysis module 101 implements only the nine intra prediction modes of AVC while encoder 103 implements all 35 modes of HEVC.

After such intra prediction or as a result thereof, an intra prediction distortion value or measure may be determined for each of picture regions 404. The intra prediction distortion value or measure may be any suitable measure of intra prediction distortion such as a mean square error of the difference, for each pixel of the pixel region, between the actual pixel (e.g., luma) value and the predicted pixel (e.g., luma) value for each pixel of the region. In an embodiment, the intra prediction distortion value or measure is an absolute value difference, for each pixel of the pixel region, between the actual pixel (e.g., luma) value and the predicted pixel (e.g., luma) value for each pixel of the region. However, any suitable intra prediction distortion measurement may be used.

As discussed, any number of features for each of picture regions 404 may be generated. In addition or in the alternative to the discussed picture region pixel variance and picture region intra prediction distortion, other features may include a pixel value range for the picture region or vertical and/or horizontal gradient measurements for the picture region. In an embodiment, features 405 include only the discussed picture region pixel variance and picture region intra prediction distortion such that features 405, for the example, of 9 picture regions 404 include 18 features. Furthermore, in the discussed example, a single grid 403 is applied to downsampled picture 402 to generate picture regions 404 and each of features 405 corresponds to a picture region of picture regions 404. In other examples, different grids of different sizes are applied to downsampled picture 402 to generate different picture regions. Such differing picture regions may then be used to extract different features. In an embodiment, 9 picture regions are used to extract 9 picture region pixel variances (i.e., one for each region) while 16 picture regions are used to extract 16 picture region intra prediction distortion values (i.e. one for each region). For example, downsampled picture 402 may be divided into first and second grids of first and second picture regions such that the first picture regions are larger than the second picture regions. First features (i.e., picture region pixel variances) are then extracted from each of the first picture regions and second features (i.e., picture region intra prediction distortion values) are then extracted from each of the second picture regions. The first and second features may then be combined into a feature vector as discussed further herein.

With continued reference to FIG. 4, as shown, features 405 may be combined with target bit rate (TBR) 311 and resolution (RES) 312 to provide feature vector (FV) 313. For example, feature vector 313 may be a 20 element feature vector including nine picture region pixel variances (e.g., 1-9 corresponding to picture regions 1-9), nine picture region intra prediction distortion values (e.g., 1-9 corresponding to picture regions 1-9), a target bitrate, and a picture resolution. However, feature vector 313 may have any suitable number elements as discussed herein.

Returning to FIG. 3, machine learning engine 102 applies a pretrained model to feature vector 313 to generate QP 114 for picture 401. As discussed, the pretrained model may be any suitable model such as a random forest classifier, a vector machine, a deep learning model, an artificial neural network, or a deep neural network with deep neural network implementations being particularly advantageous. Such a model may be pretrained using any suitable technique or techniques such as those discussed herein below. In an embodiment, machine learning engine 102 implements a deep neural network as discussed with respect to FIG. 5.

Figure 5:
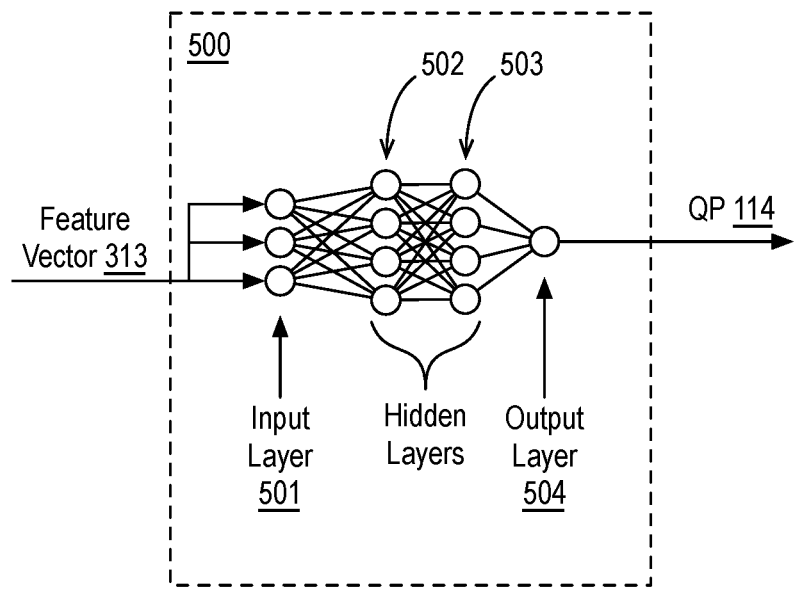
FIG. 5 illustrates an example deep neural network.

FIG. 5 illustrates an example deep neural network 500, arranged in accordance with at least some implementations of the present disclosure. As used herein, the term neural network may include any model or algorithm built using interconnected nodes between an input layer of nodes and an output layer node. For example, deep neural network 500 may be implemented via machine learning engine 102. As shown in FIG. 5, deep neural network 500 may include an input layer 501, hidden layers 502, 503, and an output layer 504. Deep neural network 500 is illustrated as having three input nodes, hidden layers with four nodes each, and one output node for the sake of clarity of presentation, however, deep neural network 500 may include any number of input or hidden layer nodes. Input layer 501 may include any suitable number of nodes such as a number of nodes equal to the number of elements in feature vector 313. For example, input layer 501 may have 20 nodes corresponding to each of the 20 dimensions of the exemplary feature vector 313 discussed above: including nine picture region pixel variances, nine picture region intra prediction distortion values, a target bitrate, and a picture resolution. In other examples, feature vectors may have fewer or more elements or dimensions and input layer 501 may have a corresponding number of nodes.

Furthermore, as in the illustrated example, deep neural network 500 includes two hidden layers 502, 503. However, deep neural network 500 may include any number of hidden layers. Hidden layers 502, 503 may include any number of nodes. For example, hidden layers 502, 503 may include 100 to 200 nodes, 200 to 500 nodes, or more. In some examples, hidden layers 502, 503 have the same number of nodes and, in other examples, one or more layers may have different numbers of nodes. As shown, output layer 504 may include a single node corresponding to an output QP 114. In some examples, deep neural network 500 may implement Hidden Markov Models (HMMs).

Returning to FIG. 3, as discussed, QP 114 may be generated by machine learning engine 102 based on machine learning engine 102 implementing deep neural network 500 or the like. Returning now to FIG. 1, QP 114 is provided to rate control module 104 of encoder 103 for the encoding of the particular picture (e.g., picture 401) of input video 111. Encoder 103 may encode the particular picture using any suitable technique or techniques such as standards compliant coding techniques. In an embodiment, QP 114 is implemented for the particular picture during a quantization of blocks and/or residual blocks of the particular picture as is known in the art.

With continued reference to FIG. 1, as discussed, device 110 provides for implementation phase 122 (e.g., actual QP prediction). The QP prediction framework or pipeline provides for input video 111 to first go through pre-analysis (via pre-analysis module 101), where features 112 (e.g., data corresponding to a particular picture of input video 111) are determined. Features 112, together with target bitrate and resolution 113 (e.g., video inputs) are provided to machine learning engine 102, where QP 114 (e.g., a QP value) for the particular picture is predicted through implementation of the pretrained model (e.g., deep neural network 500 after pre-training). QP 114 is sent to encoder 103 for bitrate control of encoder 103 and for encode of the particular picture.

Also as shown in FIG. 1, device 120 may include training corpus generator 105 and neural network training module 106. Training corpus generator 105 generates a mapping 117 for the training a machine learning model such as a neural network. Mapping 117 may include any suitable mapping of ground truth inputs and outputs that may be used by neural network training module 106 to train the model and generate neural network model 118. For example, the same features as features 112 may be used as inputs and known corresponding QP values may be used as outputs to train neural network model 118. The trained neural network model 118 is then implemented, using known techniques, by machine learning engine 102 to generate QP 114 from features 112 and target bitrate and resolution 113 as discussed herein. In an embodiment, neural network model 118 having two hidden layers is implanted by machine learning engine 102 via matrix computation with a limited number of deep neural network nodes.

Figure 6:
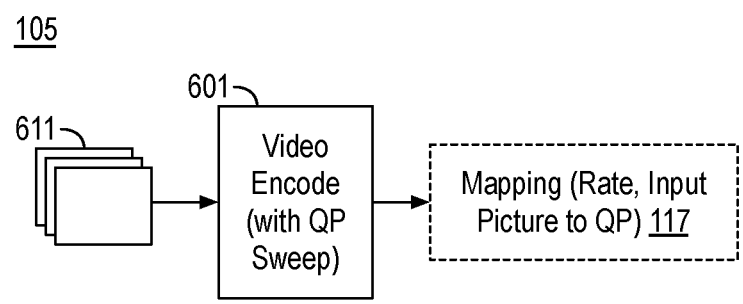
FIG. 6 is an illustrative diagram of an example training corpus generator for generating ground truth training data.

FIG. 6 is an illustrative diagram of an example training corpus generator 105 for generating ground truth training data, arranged in accordance with at least some implementations of the present disclosure. As shown in FIG. 6, training corpus generator 105 may include a video encoder 601 that may provide constant QP encoding of input pictures 611 across QP values (e.g., a constant QP encoding of each of input pictures 611 is performed at a variety of QP values) to generate mapping 117. For example, as shown in FIG. 6, mapping 117 may map inputs of a target bitrate and picture to an output of a QP such that the QP was determined by video encoder 601 encoding the picture (corresponding to a ground truth input for training the neural network) at the QP (corresponding to a ground truth output for training the neural network) to provide a bitrate (corresponding to a ground truth input for training the neural network).

For example, QP prediction may be modeled as a problem of, given a specific bitrate and input picture, determining a desired QP value, which may be expressed as follows in Equation (1):

$$QP = f_{prediction}(\text{rate}, \text{input\_frame}) \quad (1)$$

where rate is the specific or predetermined bitrate, input_frame is the specific or predetermined input picture, and $f_{prediction}$ is a function that translates the bitrate and input picture to a QP.

To build a mapping (e.g., mapping 117) for training a model such as a deep neural network, the inverse of the function provided by Equation (1) may be used to build ground truth information between input pictures, bitrate, and QP as follows in Equation (2):

$$\text{rate} = f_{encode}(QP, \text{input\_frame}) \quad (2)$$

where $f_{encode}$ is a function that translates QP and input picture to a bitrate. Therefore, by going through the encode process for sample input pictures and across QPs, mapping 117 (e.g., mapping the relationship between input pictures/target bitrates as inputs and the QP values as outputs) is provided.

Figure 7:
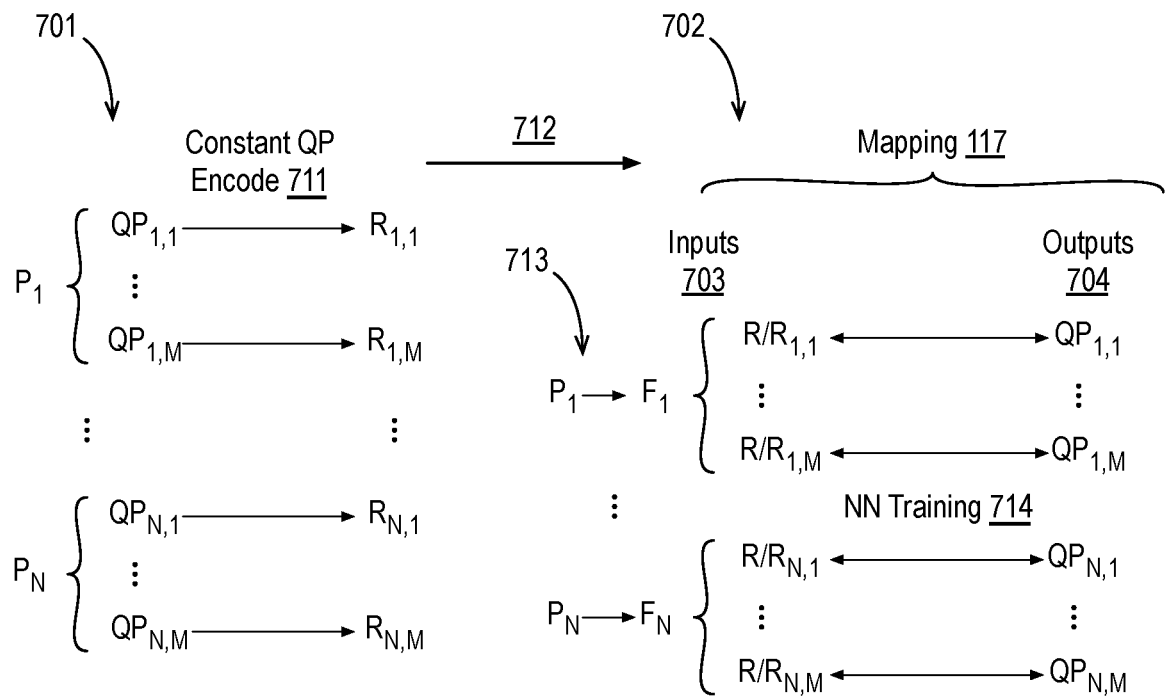
FIG. 7 is an illustrative diagram of example data structures for providing an example mapping for training a deep neural network.

FIG. 7 is an illustrative diagram of example data structures 701, 702 for providing an example mapping 117 for training a deep neural network, arranged in accordance with at least some implementations of the present disclosure. As shown in FIG. 7, in some embodiments, data structure 701 includes multiple training pictures (i.e., $P_1$-$P_N$). The training pictures may be selected using any suitable technique or techniques. For example, the training pictures may be selected to include a wide range of video picture scenarios such as outdoor scenes, indoor scenes, scenes with people, etc. As shown, data structure 701 may be generated or built by, for each picture and for each of a range of QP values (i.e., $QP_1$-$QP_M$), performing a constant QP encode 711 on each combination thereof. The QP values may be each QP value in a range of QP values allowed by a standard (e.g., 1 to 51 for HEVC), a subset thereof, or any suitable selection of QP values. As discussed for each combination of input picture (1-N) and QP value (1-M), constant QP encode 711 is performed to generate a corresponding bitrate value ($R_{1,1}$-$R_{N,M}$).

As shown, a translation 712 of data structure 701 and feature extraction 713 may be performed to generate data structure 702, which may provide mapping 117 between inputs 703 and outputs 704. As shown, inputs 703 and outputs 704 may be used for a deep neural network (NN) training 714. Deep neural network training 714 may be performed using inputs 703 and outputs 704 according to any suitable technique or techniques. For example, feature extraction 713 may be performed using any suitable technique or techniques discussed herein with respect to extracting features 112 from pictures of input video 111. For example, feature extraction 713 may include downsampling training pictures (i.e., $P_1$-$P_N$), dividing the downsampled pictures into grids of picture regions, and extracting features (e.g., picture region pixel variance, picture region intra prediction distortion, etc.), as discussed herein to generate corresponding features (i.e., $F_1$-$F_N$). The features for each of the training pictures are then combined with known bitrates (as discussed with respect to data structure 701) and known picture resolutions (e.g., R/R; rate and resolution) to provide multiple inputs 703 each of which is known to correspond to a QP (also as discussed with respect to data structure). Such correspondence or mapping 117 between inputs 703 and outputs 704 is then used to train a deep neural network as shown with respect to deep neural network training 714. For example, with reference to FIG. 1, deep neural network training 714 may be performed by neural network training module 106 to generate neural network model 118 as discussed herein.

Figure 8:
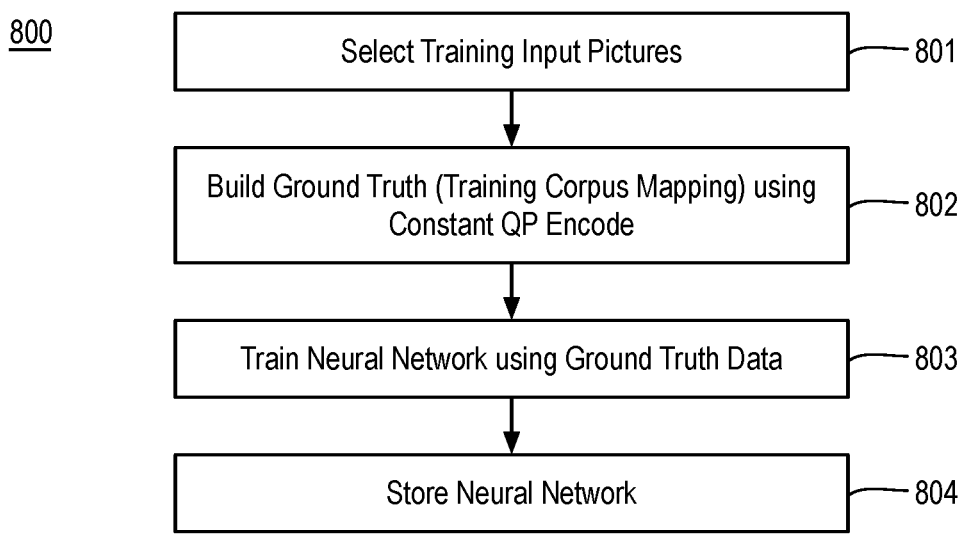
FIG. 8 is a flow diagram illustrating an example process for training a neural network for QP prediction.

FIG. 8 is a flow diagram illustrating an example process 800 for training a neural network for QP prediction, arranged in accordance with at least some implementations of the present disclosure. Process 800 may include one or more operations 801-804 as illustrated in FIG. 8. Process 800 may be performed by a device (e.g., device 120 as discussed herein) to generate a pretrained neural network.

Process 800 may begin at operation 801, where a set of training video pictures are selected. The set of training video pictures may include any suitable set of training video pictures such as a set of pictures with a variety of scenes (outdoor, indoor, scenes with people, etc.) at a variety of resolutions, complexities, etc. Any number of training video pictures may be used for the training set such as thousands, tens of thousands, or more.

Processing continues at operation 802, where ground truth information is built using constant QP encoding to generate a training corpus matching. For example, for each picture of the set of training video pictures a constant QP encoding may be performed at a variety of QP values (e.g., at each or some of the available 1-51 QP values) to determine, for each picture/QP value pair, a bitrate value. The constant QP encoding may be performed using any suitable technique or techniques that matches the ultimate encode that is to be performed during implementation. For example, the constant QP encoding may be a standards compliant encode. Furthermore, for each picture of the set of training video pictures, features are extracted using any suitable technique or techniques that, again, match the feature extraction to be performed during implementation. In an embodiment, features are extracted for each picture of the set of training pictures using techniques discussed with respect to feature extraction 400. As discussed, such features are selected to provide efficient mapping to a selected QP during the implementation phase. The training mapping is then generated with inputs being combinations of Features/Resolutions/Rates, which may be implemented as training feature vectors, and the output for each combination being the QP that determined the corresponding Rate during constant QP encode. In an embodiment, the training mapping is generated as discussed with respect to data structures 701, 702.

Processing continues at operation 803, where the ground truth information training mapping discussed with respect to operation 802 is used to train a machine learning model such as a deep learning neural network. The machine learning model (e.g., deep learning neural network) may be trained using any suitable technique or techniques. Processing continues at operation 804, where the machine learning model (e.g., deep learning neural network) is stored for subsequent implementation. For example, parameters characteristic of the trained model may be stored to memory in any suitable data structure.

In an embodiment, a deep learning neural network is trained by automatically building up those features residing in the parameters of the deep learning neural network using the discussed training mapping. The techniques discussed herein use such deep learning neural network training to automatically analyze the input pictures using the selected features and via the deep learning neural network to predict a QP for encode.

Figure 9:
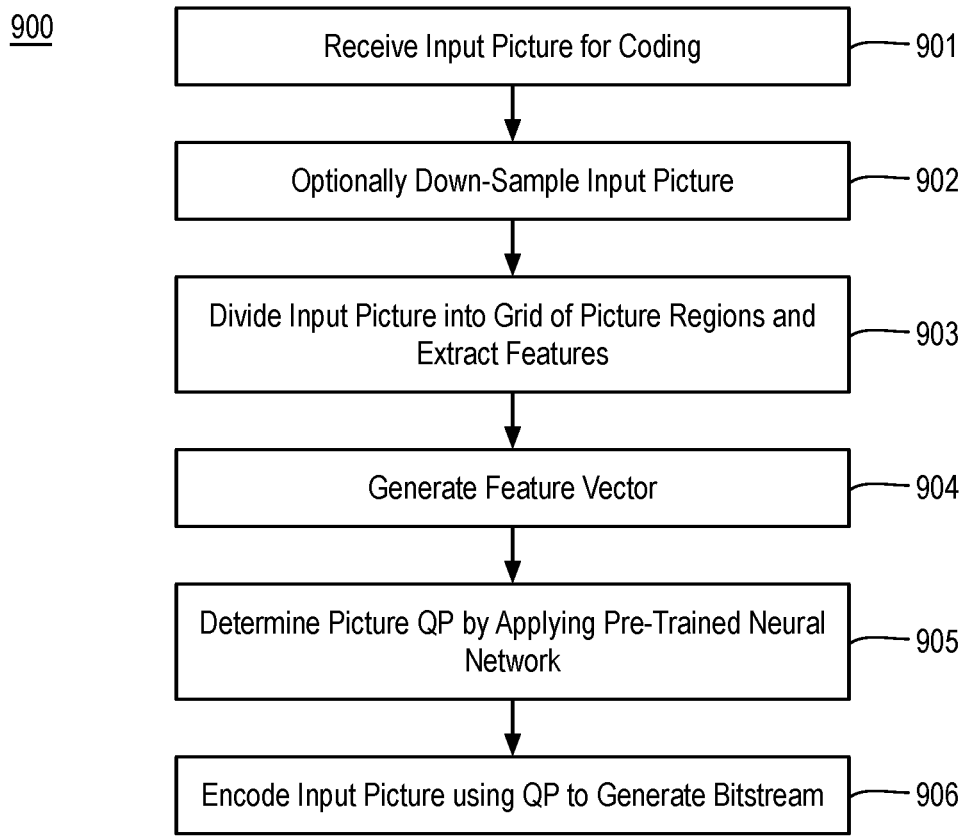
FIG. 9 is a flow diagram illustrating an example process for predicting QP in an encode pipeline.

FIG. 9 is a flow diagram illustrating an example process 900 for predicting QP in an encode pipeline, arranged in accordance with at least some implementations of the present disclosure. Process 900 may include one or more operations 901-905 as illustrated in FIG. 9. Process 900 may be performed by a device (e.g., device 110 as discussed herein) to encode an input picture generate a pretrained neural network.

Process 900 may begin at operation 901, where an input picture is received for encoding. The input picture may be received using any suitable technique or techniques. For example, the input picture may be a picture or frame of a group of pictures, video sequence, or the like received for encoding. In an embodiment, the input picture is an I-picture or a scene change picture. In an embodiment, process 900 is performed responsive to the input picture being an I-picture or a scene change picture such that process 900 is not performed for other picture types (e.g., P-pictures, B-pictures) of a group of pictures or video sequence.

Processing continues at operation 902, where the input picture is optionally downsampled to generate a downsampled picture. The input picture may be downsampled using any suitable technique or techniques such as uniform downsampling by any ratio such as 2× downsampling, 4× downsampling, or 8× downsampling. As discussed, in some embodiments, the input picture is not downsampled.

Processing continues at operation 903, where the downsampled input picture or the input picture itself is divided into a grid of picture regions and features are extracted from the regions. The picture may be divided into any number of regions such as 9, 15, 16, or 25 regions. In an embodiment, the regions are of equal size and collectively cover the entirety of picture. However, regions of differing sizes may be used. The feature(s) may be extracted from each region using any suitable technique or techniques. In an embodiment, a picture region pixel variance is determined for each region. In an embodiment, a picture region intra prediction distortion is determined for each region. In an embodiment, a picture region pixel variance and a picture region intra prediction distortion is determined for each region. In addition or in the alternative, one or more other features such a pixel value range, vertical gradient measurements, and/or horizontal gradient measurements for each picture region may be used.

In an embodiment, the picture may be divided into picture regions of differing sizes for the extraction of different features. For example, the picture may be divided into first and second grids of first and second picture regions such that the first picture regions are larger than the second picture regions. First features (i.e., picture region pixel variances) may then be extracted from each of the first picture regions and second features (i.e., picture region intra prediction distortion values) are then extracted from each of the second picture regions. The first and second features may then be combined into a feature vector as discussed further herein. In an embodiment, larger pixel regions are used for the extraction of picture region pixel variances and smaller pixel regions are used for the extraction of picture region intra prediction distortion values.

Processing continues at operation 904, where a feature vector is generated using the extracted features. The feature vector may be generated using any suitable technique or techniques. In an embodiment, the extracted features are ordered according to a predefined order into an array of elements including the extracted features, a predetermined target bitrate, and a predetermined resolution of the input picture. In an embodiment, given a number of regions, N, and a number of features per region of M, the feature vector includes M×N+2 elements including M×N extracted features, the predetermined target bitrate, and the predetermined resolution of the input picture.

Processing continues at operation 905, where an estimated quantization parameter is determined for the input picture by applying a pretrained model such as a deep learning neural network to the feature vector generated at operation 904. The model may be applied to the feature vector using any suitable technique or techniques. In an embodiment, model parameters corresponding to a deep learning neural network are stored in memory and implemented via a processor to the feature vector.

Processing continues at operation 906, where the input picture is encoded using the quantization parameter estimated at operation 905 to generate a bitstream. The input picture may be encoded using any suitable technique or techniques. In an embodiment, the input picture is encoded using a standards compliant encoder to generate a standards compliant bitstream such as a bitstream that is AVC compliant or HEVC compliant.

Process 900 or portions thereof may be repeated any number of times either in series or in parallel for any number input pictures. As discussed, process 900 provides for an encode pipeline that generates a picture level QP for an input picture using a pretrained model such as a neural network. The pretrained model may be trained using any suitable technique or techniques such as those discussed with respect to process 800. As discussed, a picture is encoded with the predicted picture level QP to generate at least a portion of a bitstream.

Figure 10:
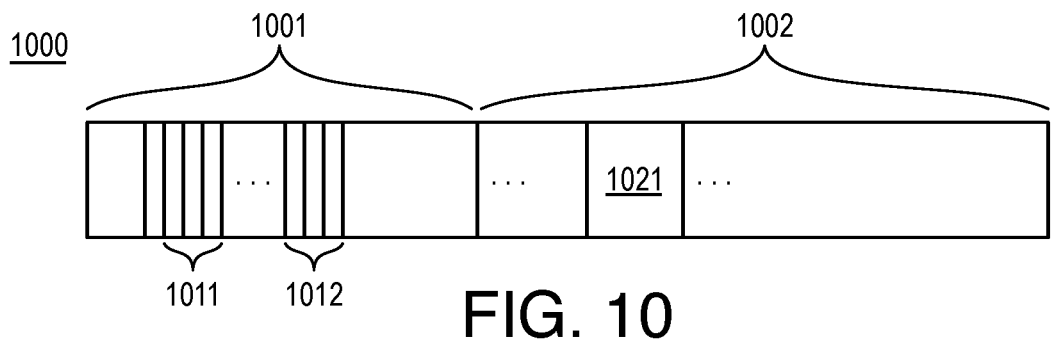
FIG. 10 illustrates an example bitstream.

FIG. 10 illustrates an example bitstream 1000, arranged in accordance with at least some implementations of the present disclosure. In some examples, bitstream 1000 may correspond to bitstream 115 as discussed with respect to FIG. 1. As shown in FIG. 10, in some embodiments, bitstream 1000 includes a header portion 1001 and a data portion 1002. In an embodiment, header portion 1001 includes a picture header 1011 and a slice header 1012.

In an embodiment, an indicator or indicators corresponding to a picture level QP as determined using the techniques discussed herein are implemented or inserted in picture header 1011. Furthermore, data portion 1002 may include encoded picture data 1021 for a picture coded using predicted QP such that encoded picture data 1021 includes, for example, encoded quantized transform coefficients, intra mode selection information, etc. corresponding to the encoded picture. In some embodiments, bitstream 1000 is a standards compliant bitstream such that its formatting is standards defined so a decoder that complies with the standard may decode bitstream 1000. For example, bitstream 1000 may be AVC compliant, HEVC compliant, or compliant with any other standard.

The techniques discussed herein provide low computational complexity and high quality results. In some implementations, the QP values predicted using the techniques discussed herein provide QP values that have an error ratio between the predicted QP versus the QP from ground truth (e.g., error rate=(predicted QP−ground truth QP)/ground truth QP) of less than 20% prediction error ratio for all results and an average prediction error of less than 5% in over 84% of cases.

Figure 11:
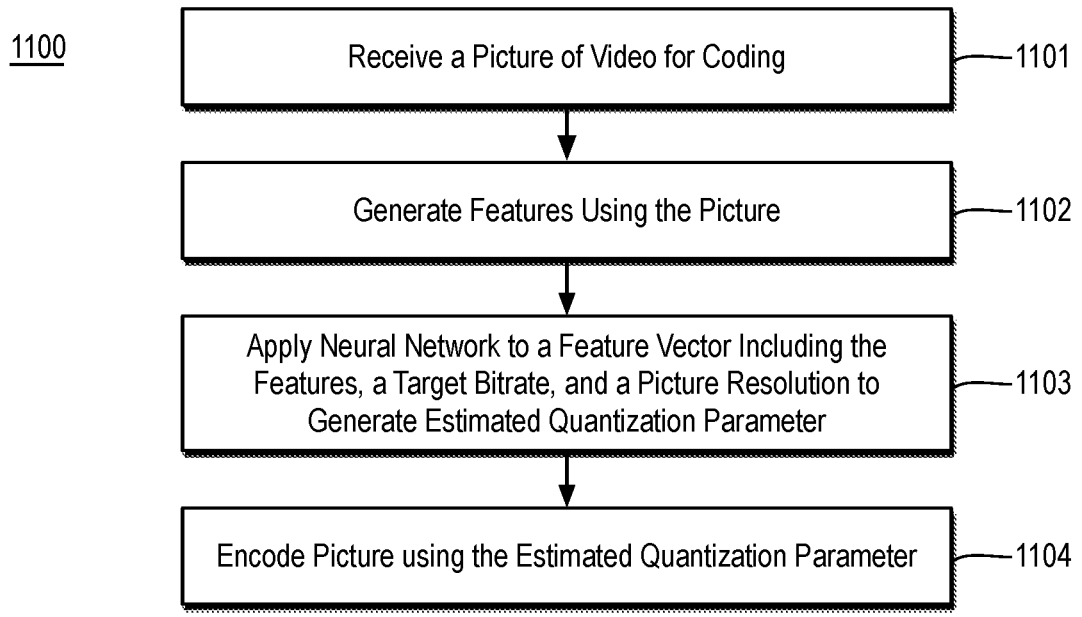
FIG. 11 is a flow diagram illustrating an example process for video coding including determining a quantization parameter using a neural network.

FIG. 11 is a flow diagram illustrating an example process 1100 for video coding including determining a quantization parameter using a neural network, arranged in accordance with at least some implementations of the present disclosure. Process 1100 may include one or more operations 1101-1104 as illustrated in FIG. 11. Process 1100 may form at least part of a video coding process. By way of non-limiting example, process 1100 may form at least part of a video coding process as performed by any device or system as discussed herein such as device 110. Furthermore, process 1100 will be described herein with reference to system 1200 of FIG. 12.

Figure 12:
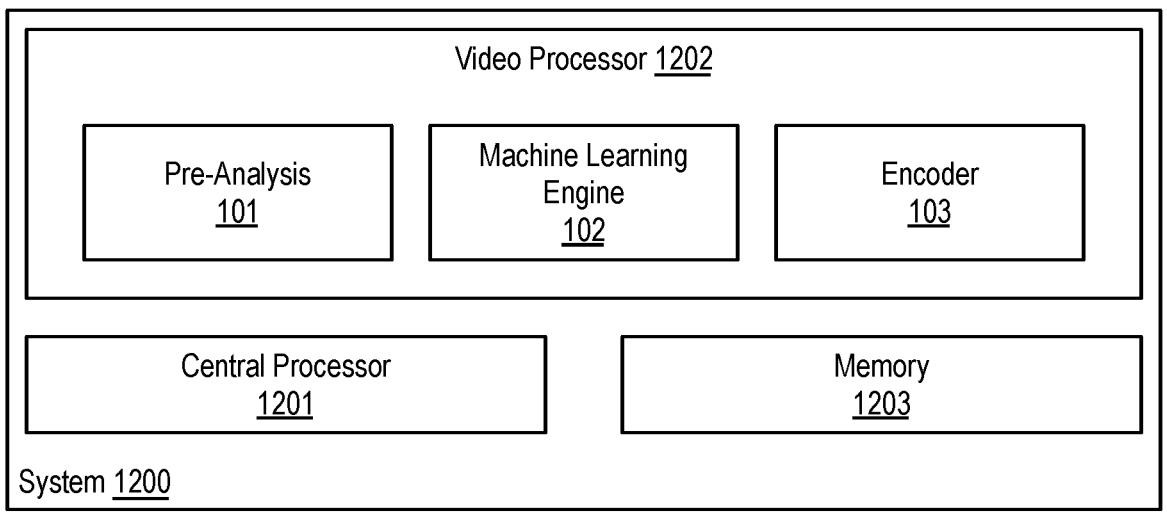
FIG. 12 is an illustrative diagram of an example system for video coding including determining a quantization parameter using a neural network.

FIG. 12 is an illustrative diagram of an example system 1200 for video coding including determining a quantization parameter using a neural network, arranged in accordance with at least some implementations of the present disclosure. As shown in FIG. 12, system 1200 may include a central processor 1201, a video processor 1202, and a memory 1203. Also as shown, video processor 1202 may include or implement pre-analysis module 101, machine learning engine 102, and encoder 103. In an embodiment, memory 1203 stores neural network model 118 for implementation by machine learning engine 102. Furthermore, in the example of system 1200, memory 1203 may store video data or related content such as picture data, feature values, feature vectors, model parameter data, quantization parameters, and/or any other data as discussed herein.

As shown, in some embodiments, implement pre-analysis module 101, machine learning engine 102, and encoder 103 are implemented via video processor 1202. In other embodiments, one or more or portions of implement pre-analysis module 101, machine learning engine 102, and encoder 103 are implemented via central processor 1201 or another processing unit such as an image processor, a graphics processor, or the like.

Video processor 1202 may include any number and type of video, image, or graphics processing units that may provide the operations as discussed herein. Such operations may be implemented via software or hardware or a combination thereof. For example, video processor 1202 may include circuitry dedicated to manipulate pictures, picture data, or the like obtained from memory 1203. Central processor 1201 may include any number and type of processing units or modules that may provide control and other high level functions for system 1200 and/or provide any operations as discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory.

In an embodiment, one or more or portions of implement pre-analysis module 101, machine learning engine 102, and encoder 103 are implemented via an execution unit (EU). The EU may include, for example, programmable logic or circuitry such as a logic core or cores that may provide a wide array of programmable logic functions. In an embodiment, one or more or portions of implement pre-analysis module 101, machine learning engine 102, and encoder 103 are implemented via dedicated hardware such as fixed function circuitry or the like. Fixed function circuitry may include dedicated logic or circuitry and may provide a set of fixed function entry points that may map to the dedicated logic for a fixed purpose or function.

Returning to discussion of FIG. 11, process 1100 may begin at operation 1101, where a picture of an input video for is received for encoding. The picture may be any suitable video picture such as an I-picture or a scene change picture and the input video may be any suitable input video of any suitable format. For example, the picture may be received by memory 1203 for storage and subsequently by video processor 1202 for processing.

Processing may continue at operation 1102, where a plurality of features are generated using the picture. For example, the features may be generated by pre-analysis module 101 as implemented by video processor 1202. The features may be generated using any suitable technique or techniques. In an embodiment, generating the features comprises dividing the picture into a grid of picture regions, determining a feature value for each picture region of the grid of picture regions, and providing the feature values as at least a subset of the features. For example, the feature value for each picture region may be a pixel variance of the picture region or a predicted distortion for the picture region.

In an embodiment, generating the features includes dividing the picture into a grid of picture regions, determining a first feature value and a second feature value for each picture region of the grid of picture regions such that the first feature value for each picture region is a pixel variance of the picture region and the second feature value for each picture region is a predicted distortion for the picture region, and providing the first and second feature values as at least a subset of features.

In an embodiment, generating the features includes downsampling the picture to generate a downsampled picture, dividing the downsampled picture into a grid of downsampled picture regions, determining a pixel variance for each region of the grid of downsampled picture regions, performing intra prediction for each region of the grid of downsampled picture regions, generating an average prediction distortion for each region of the grid of downsampled picture based on the intra prediction, and providing the pixel variance for each region and the average prediction distortion for each region as at least a portion of the plurality of features. In an embodiment, the discussed intra prediction is a limited intra prediction using only a subset of intra prediction modes available during an encoding of the picture as discussed with respect to operation 1104. In an embodiment, a feature vector operated on by a neural network at operation 1103, as discussed below, may consist of the pixel variance for each region, the average prediction distortion for each region, a target bitrate for the picture received at operation 1101, and a resolution of the picture received at operation 1101. The picture or downsampled picture may be divided into any number of regions such as 9 regions, 15 regions, 16 regions, 20 regions, 25 regions, or more. In an embodiment, the grid of downsampled picture regions consists of nine non-overlapping picture regions that collectively cover the entire downsampled picture.

Processing may continue at operation 1103, where a machine learning engine is applied to a feature vector including the features generated at operation 1102, a target bitrate for the picture, and a resolution of the picture to generate an estimated quantization parameter for encoding the picture. For example, the estimated quantization parameter may be determined by machine learning engine 102 as implemented by video processor 1202. The target bitrate and picture resolution may be determined using any suitable technique or techniques. For example, the target bitrate and picture resolution may be provided by an application employing the discussed encode pipeline, selected by a user, provided as a default, etc. The machine learning engine may be any suitable machine learning engine and the machine learning engine may be applied to the feature vector to determine the estimated quantization parameter using any suitable technique or techniques. In an embodiment, the machine learning engine is one of a random forest classifier, a vector machine, or a neural network. In an embodiment, the machine learning engine is a neural network including an input layer for receiving the feature vector, an output layer for providing the estimated quantization parameter, and two or more hidden layers between the input layer and the output layer.

Processing may continue at operation 1104, where the picture is encoded using the estimated quantization parameter to generate at least a portion of a bitstream. The picture may be encoded using the estimated quantization parameter using any suitable technique or techniques. Furthermore, the bitstream may be any suitable bitstream. In an embodiment, the encode is implemented to generate a standards compliant bitstream. For example, the bitstream may be AVC or HEVC compliant or compliant with any other standard.

Process 1100 may be repeated any number of times either in series or in parallel for any number pictures. As discussed, process 1100 may provide for video encoding including determining a quantization parameter using a neural network or other machine learning model.

Various components of the systems described herein may be implemented in software, firmware, and/or hardware and/or any combination thereof. For example, various components of the systems or devices discussed herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
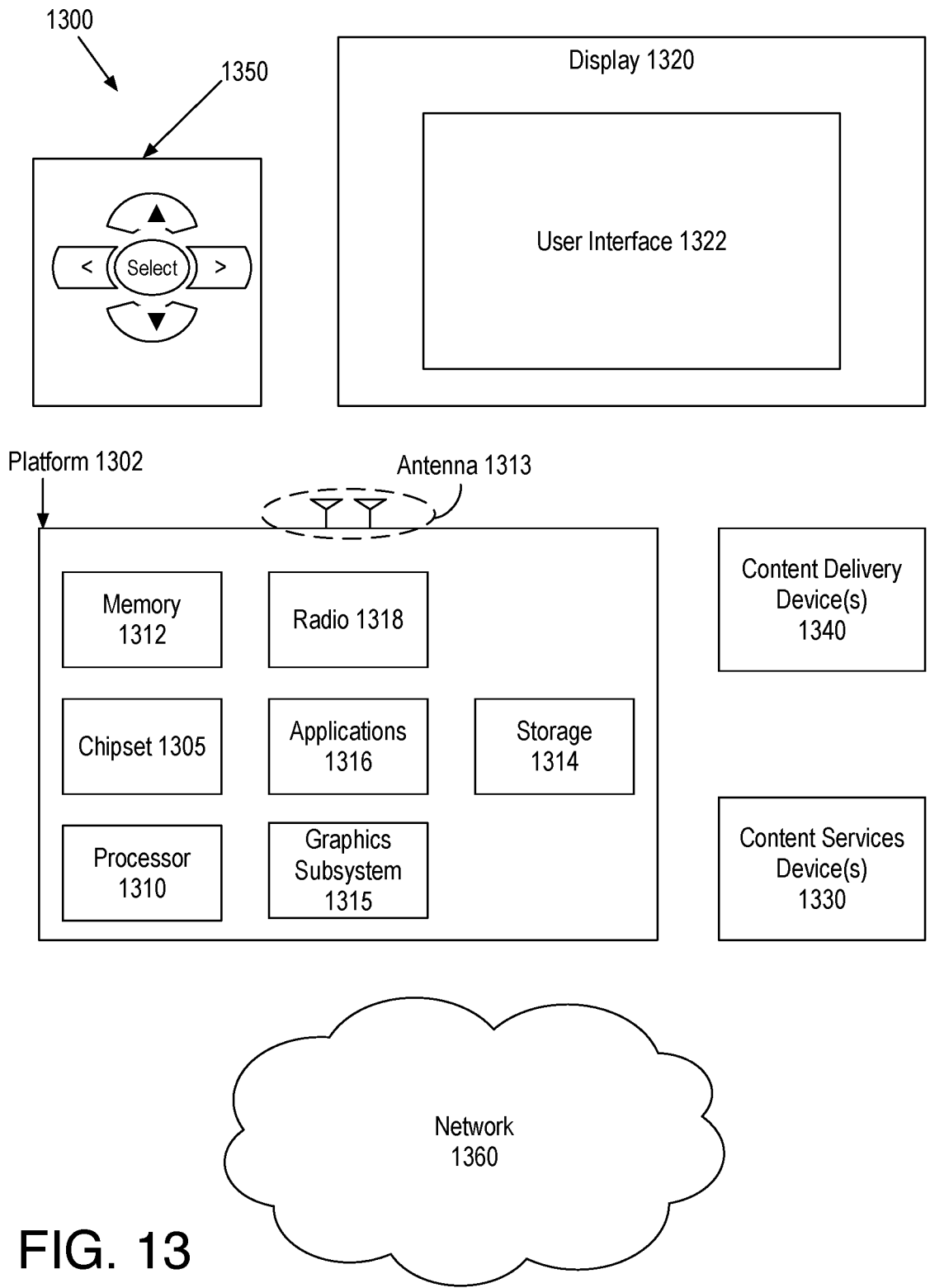
FIG. 13 is an illustrative diagram of an example system.

FIG. 13 is an illustrative diagram of an example system 1300, arranged in accordance with at least some implementations of the present disclosure. In various implementations, system 1300 may be a mobile system although system 1300 is not limited to this context. For example, system 1300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320.

Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of may be used to interact with user interface 1322, for example. In various embodiments, navigation may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of may be replicated on a display (e.g., display 1320) by movements of a pointer, cursor, focus ring, or other visual indicators displayed on the display. For example, under the control of software applications 1316, the navigation features located on navigation may be mapped to virtual navigation features displayed on user interface 1322, for example. In various embodiments, may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Figure 14:
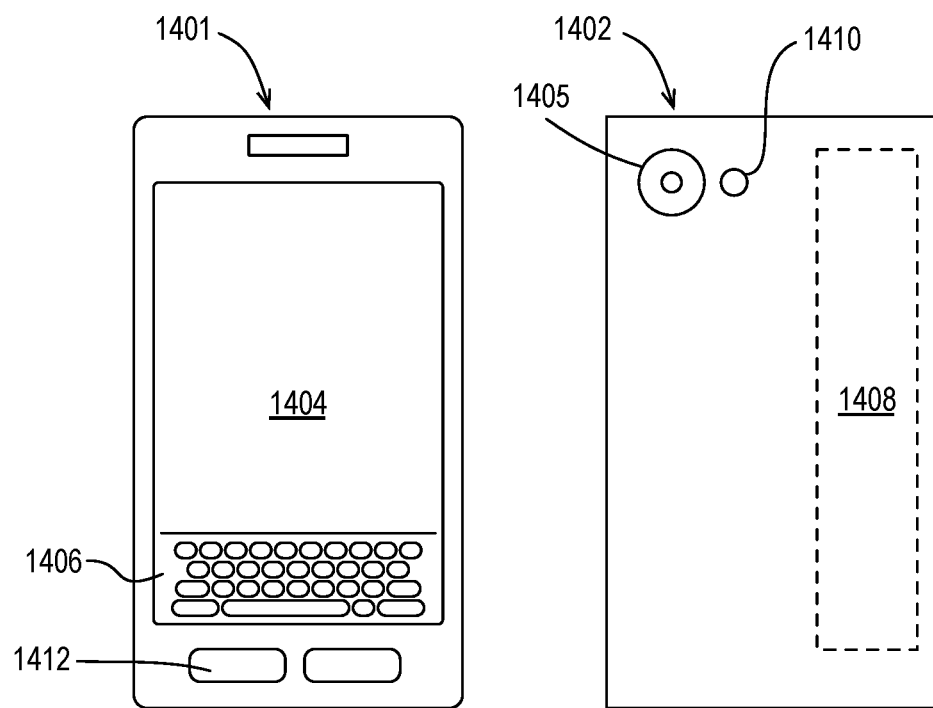
FIG. 14 illustrates an example device, all arranged in accordance with at least some implementations of the present disclosure.

As described above, system 1300 may be embodied in varying physical styles or form factors. FIG. 14 illustrates an example small form factor device 1400, arranged in accordance with at least some implementations of the present disclosure. In some examples, system 1300 may be implemented via device 1400. In other examples, system 100 or portions thereof may be implemented via device 1400. In various embodiments, for example, device 1400 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 1400 may include a housing with a front 1401 and a back 1402. Device 1400 includes a display 1404, an input/output (I/O) device 1406, and an integrated antenna 1408. Device 1400 also may include navigation features 1412. I/O device 1406 may include any suitable I/O device for entering information into a mobile computing device. Examples for I/O device 1406 may include an alphanumeric keyboard, a numeric keypad, a touch pad, input keys, buttons, switches, microphones, speakers, voice recognition device and software, and so forth. Information also may be entered into device 1400 by way of microphone (not shown), or may be digitized by a voice recognition device. As shown, device 1400 may include a camera 1405 (e.g., including a lens, an aperture, and an imaging sensor) and a flash 1410 integrated into back 1402 (or elsewhere) of device 1400. In other examples, camera 1405 and flash 1410 may be integrated into front 1401 of device 1400 or both front and back cameras may be provided. Camera 1405 and flash 1410 may be components of a camera module to originate image data processed into streaming video that is output to display 1404 and/or communicated remotely from device 1400 via antenna 1408 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following embodiments pertain to further embodiments.

In one or more first embodiments, a computer-implemented method for video encoding comprises receiving a picture of an input video for encoding, generating a plurality of features using the picture, applying a machine learning engine to a feature vector comprising the features, a target bitrate for the picture, and a resolution of the picture to generate an estimated quantization parameter for encoding the picture, and encoding the picture using the estimated quantization parameter to generate at least a portion of a bitstream.

In one or more second embodiments, further to the first embodiments, generating the plurality of features comprises dividing the picture into a grid of picture regions, determining a feature value for each picture region of the grid of picture regions, and providing the feature values as at least a subset of the plurality of features.

In one or more third embodiments, further to any of the first or second embodiments, the feature value for each picture region comprises a pixel variance of the picture region.

In one or more fourth embodiments, further to any of the first through third embodiments, generating the plurality of features further comprises determining a second feature value for each picture region of the grid of picture regions, such that the feature value for each picture region comprises a pixel variance of the picture region and the second feature value for each picture region comprises a predicted distortion for the picture region and providing the second feature values as at least a second subset of the plurality of features.

In one or more fifth embodiments, further to any of the first through fourth embodiments, generating the plurality of features further comprises dividing the picture into a grid of picture regions, determining a first feature value and a second feature value for each picture region of the grid of picture regions, such that the first feature value for each picture region comprises a pixel variance of the picture region and the second feature value for each picture region comprises a predicted distortion for the picture region, and providing the first and second feature values as at least a subset of the plurality of features.

In one or more sixth embodiments, further to any of the first through fifth embodiments, generating the plurality of features comprises downsampling the picture to generate a downsampled picture, dividing the downsampled picture into a grid of downsampled picture regions, determining a pixel variance for each region of the grid of downsampled picture regions, performing intra prediction for each region of the grid of downsampled picture regions, generating an average prediction distortion for each region of the grid of downsampled picture based on the intra prediction, and providing the pixel variance for each region and the average prediction distortion for each region as at least a portion of the plurality of features.

In one or more seventh embodiments, further to any of the first through sixth embodiments, the feature vector consists of the pixel variance for each region, the average prediction distortion for each region, the target bitrate for the picture, and the resolution of the picture.

In one or more eighth embodiments, further to any of the first through seventh embodiments, said intra prediction comprises a limited intra prediction using only a subset of intra prediction modes available during said encoding of the picture.

In one or more ninth embodiments, further to any of the first through eighth embodiments, the machine learning engine comprises one of a random forest classifier, a vector machine, or a neural network.

In one or more tenth embodiments, further to any of the first through ninth embodiments, the machine learning engine comprises a neural network comprising an input layer for receiving the feature vector, an output layer for providing the estimated quantization parameter, and two or more hidden layers between the input layer and the output layer.

In one or more eleventh embodiments, further to any of the first through tenth embodiments, the picture comprises an I-frame and the bitstream comprises a standards compliant bitstream.

In one or more twelfth embodiments, a system for video coding comprises a memory to store a picture of an input video for encoding and a processor coupled to the memory, the processor to generate a plurality of features using the picture, to apply a machine learning engine to a feature vector comprising the features, a target bitrate for the picture, and a resolution of the picture to generate an estimated quantization parameter for encoding the picture, and to encode the picture using the estimated quantization parameter to generate at least a portion of a bitstream.

In one or more thirteenth embodiments, further to the twelfth embodiments, the processor to generate the plurality of features comprises the processor to divide the picture into a grid of picture regions, to determine a feature value for each picture region of the grid of picture regions, and to provide the feature values as at least a subset of the plurality of features.

In one or more fourteenth embodiments, further to any of the twelfth or thirteenth embodiments, the feature value for each picture region comprises a pixel variance of the picture region.

In one or more fifteenth embodiments, further to any of the twelfth through fourteenth embodiments, the processor to generate the plurality of features comprises the processor to divide the picture into a grid of picture regions, to determine a first feature value and a second feature value for each picture region of the grid of picture regions, such that the first feature value for each picture region comprises a pixel variance of the picture region and the second feature value for each picture region comprises a predicted distortion for the picture region, and to provide the first and second feature values as at least a subset of the plurality of features.

In one or more sixteenth embodiments, further to any of the twelfth through fifteenth embodiments, the processor to generate the plurality of features comprises the processor to downsample the picture to generate a downsampled picture, to divide the downsampled picture into a grid of downsampled picture regions, to determine a pixel variance for each region of the grid of downsampled picture regions, to perform intra prediction for each region of the grid of downsampled picture regions, to generate an average prediction distortion for each region of the grid of downsampled picture based on the intra prediction, and to provide the pixel variance for each region and the average prediction distortion for each region as at least a portion of the plurality of features, such that the feature vector consists of the pixel variance for each region, the average prediction distortion for each region, the target bitrate for the picture, and the resolution of the picture.

In one or more seventeenth embodiments, further to any of the twelfth through sixteenth embodiments, the processor to generate the plurality of features comprises the processor to downsample the picture to generate a downsampled picture, to divide the downsampled picture into a grid of downsampled picture regions, to determine a pixel variance for each region of the grid of downsampled picture regions, to perform intra prediction for each region of the grid of downsampled picture regions, to generate an average prediction distortion for each region of the grid of downsampled picture based on the intra prediction, and to provide the pixel variance for each region and the average prediction distortion for each region as at least a portion of the plurality of features.

In one or more eighteenth embodiments, further to any of the twelfth through seventeenth embodiments, said intra prediction comprises a limited intra prediction using only a subset of intra prediction modes available during said encoding of the picture.

In one or more nineteenth embodiments, further to any of the twelfth through eighteenth embodiments, the machine learning engine comprises one of a random forest classifier, a vector machine, or a neural network.

In one or more twentieth embodiments, further to any of the twelfth through nineteenth embodiments, the machine learning engine comprises a neural network comprising an input layer for receiving the feature vector, an output layer for providing the estimated quantization parameter, and two or more hidden layers between the input layer and the output layer.

In one or more twenty-first embodiments, further to any of the twelfth through twentieth embodiments, the picture comprises an I-frame and the bitstream comprises a standards compliant bitstream.

In one or more twenty-second embodiments, a system comprises means for receiving a picture of an input video for encoding, means for generating a plurality of features using the picture, means for applying a machine learning engine to a feature vector comprising the features, a target bitrate for the picture, and a resolution of the picture to generate an estimated quantization parameter for encoding the picture, and means for encoding the picture using the estimated quantization parameter to generate at least a portion of a bitstream.

In one or more twenty-third embodiments, further to the twenty-second embodiments, the means for generating the plurality of features comprise means for dividing the picture into a grid of picture regions, means for determining a feature value for each picture region of the grid of picture regions, and means for providing the feature values as at least a subset of the plurality of features.

In one or more twenty-fourth embodiments, further to any of the twenty-second or twenty-third embodiments, the means for generating the plurality of features comprise means for downsampling the picture to generate a downsampled picture, means for dividing the downsampled picture into a grid of downsampled picture regions, means for determining a pixel variance for each region of the grid of downsampled picture regions, means for performing intra prediction for each region of the grid of downsampled picture regions, means for generating an average prediction distortion for each region of the grid of downsampled picture based on the intra prediction, and means for providing the pixel variance for each region and the average prediction distortion for each region as at least a portion of the plurality of features.

In one or more twenty-fifth embodiments, at least one machine readable medium comprising a plurality of instructions that, in response to being executed on a computing device, cause the computing device to perform video coding by receiving a picture of an input video for encoding, generating a plurality of features using the picture, applying a machine learning engine to a feature vector comprising the features, a target bitrate for the picture, and a resolution of the picture to generate an estimated quantization parameter for encoding the picture, and encoding the picture using the estimated quantization parameter to generate at least a portion of a bitstream.

In one or more twenty-sixth embodiments, further to the twenty-fifth embodiments, generating the plurality of features comprises dividing the picture into a grid of picture regions, determining a feature value for each picture region of the grid of picture regions, and providing the feature values as at least a subset of the plurality of features.

In one or more twenty-seventh embodiments, further to any of the twenty-fifth or twenty-sixth embodiments, generating the plurality of features comprises dividing the picture into a grid of picture regions, determining a first feature value and a second feature value for each picture region of the grid of picture regions, such that the first feature value for each picture region comprises a pixel variance of the picture region and the second feature value for each picture region comprises a predicted distortion for the picture region, and providing the first and second feature values as at least a subset of the plurality of features In one or more twenty-eighth embodiments, further to any of the twenty-fifth through twenty-seventh embodiments, generating the plurality of features comprises downsampling the picture to generate a downsampled picture, dividing the downsampled picture into a grid of downsampled picture regions, determining a pixel variance for each region of the grid of downsampled picture regions, performing intra prediction for each region of the grid of downsampled picture regions, generating an average prediction distortion for each region of the grid of downsampled picture based on the intra prediction, and providing the pixel variance for each region and the average prediction distortion for each region as at least a portion of the plurality of features.

In one or more twenty-ninth embodiments, further to any of the twenty-fifth through twenty-eighth embodiments, the feature vector consists of the pixel variance for each region, the average prediction distortion for each region, the target bitrate for the picture, and the resolution of the picture.

In one or more thirtieth embodiments, further to any of the twenty-fifth through twenty-ninth embodiments, said intra prediction comprises a limited intra prediction using only a subset of intra prediction modes available during said encoding of the picture.

In one or more thirty-first embodiments, further to any of the twenty-fifth through thirtieth embodiments, the machine learning engine comprises a neural network comprising an input layer for receiving the feature vector, an output layer for providing the estimated quantization parameter, and two or more hidden layers between the input layer and the output layer.

In one or more thirty-second embodiments, at least one machine readable medium may include a plurality of instructions that in response to being executed on a computing device, causes the computing device to perform a method according to any one of the above embodiments.

In one or more thirty-third embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A computer-implemented method for video encoding comprising:
    receiving a picture of an input video for encoding;
    generating a plurality of features using the picture by:
        dividing a downsampled picture corresponding to the picture into a grid of downsampled picture regions;
        performing intra prediction to generate an intra prediction distortion value for each of the downsampled picture regions; and
        determining a pixel variance, a vertical gradient measurement, and a horizontal gradient measurement for each of the downsampled picture regions;
    applying a machine learning engine to a feature vector comprising the features, a target bitrate for the picture, and a resolution of the picture to generate a quantization parameter for encoding the picture, wherein the features comprise the intra prediction distortion values, the pixel variances, the vertical gradient measurements, and the horizontal gradient measurements; and
    encoding the picture using the quantization parameter to generate at least a portion of a bitstream.

2. The method of claim 1, wherein generating the plurality of features further comprises:
    dividing the picture into a second grid of second picture regions that are smaller than the downsampled picture regions; and
    determining a second intra prediction distortion value for each of the second picture regions, wherein the feature vector further comprise the second intra prediction distortion values.

3. The method of claim 1, wherein the feature vector further comprises pixel value ranges for each of the downsampled picture regions.

4. The method of claim 1, wherein said intra prediction comprises a limited intra prediction using only a subset of intra prediction modes available during said encoding of the picture, wherein the subset consists of only DC, vertical, and horizontal prediction modes.

5. The method of claim 1, wherein each intra prediction distortion value comprises a difference, for each pixel of a particular pixel region, between an actual pixel value and a predicted pixel value.

6. The method of claim 1, wherein the machine learning engine comprises a neural network comprising an input layer for receiving the feature vector, an output layer for providing the estimated quantization parameter, and two or more hidden layers between the input layer and the output layer.

7. The method of claim 1, wherein the picture comprises an I-frame and the bitstream comprises a standards compliant bitstream.

8. A system for video coding comprising:
a memory to store a picture of an input video for encoding; and
a processor coupled to the memory, the processor to:
generate a plurality of features using the picture, wherein to generate the features, the processor is to divide a downsampled picture corresponding to the picture into a grid of downsampled picture regions, perform intra prediction to generate an intra prediction distortion value for each of the downsampled picture regions, and to determine a pixel variance, a vertical gradient measurement, and a horizontal gradient measurement for each of the downsampled picture regions;
apply a machine learning engine to a feature vector comprising the features, a target bitrate for the picture, and a resolution of the picture to generate a quantization parameter for encode of the picture, wherein the features comprise the intra prediction distortion values, the pixel variances, the vertical gradient measurements, and the horizontal gradient measurements; and
encode the picture using the quantization parameter to generate at least a portion of a bitstream.

9. The system of claim 8, wherein the processor to generate the plurality of features comprises the processor further to:
divide the picture into a second grid of second picture regions that are smaller than the downsampled picture regions; and
determine a second intra prediction distortion value for each of the second picture regions, wherein the feature vector further comprise the second intra prediction distortion values.

10. The system of claim 8, wherein the feature vector further comprises pixel value ranges for each of the downsampled picture regions.

11. The system of claim 8, wherein said intra prediction comprises a limited intra prediction using only a subset of intra prediction modes available during said encode of the picture, wherein the subset consists of only DC, vertical, and horizontal prediction modes.

12. At least one non-transitory machine readable medium comprising a plurality of instructions that, in response to being executed on a computing device, cause the computing device to perform video coding by:
receiving a picture of an input video for encoding;
generating a plurality of features using the picture by:
dividing a downsampled picture corresponding to the picture into a grid of downsampled picture regions;
performing intra prediction to generate an intra prediction distortion value for each of the downsampled picture regions; and
determining a pixel variance, a vertical gradient measurement, and a horizontal gradient measurement for each of the downsampled picture regions;
applying a machine learning engine to a feature vector comprising the features, a target bitrate for the picture, and a resolution of the picture to generate a quantization parameter for encoding the picture, wherein the features comprise the intra prediction distortion values, the pixel variances, the vertical gradient measurements, and the horizontal gradient measurements; and
encoding the picture using the quantization parameter to generate at least a portion of a bitstream.

13. The non-transitory machine readable medium of claim 12, wherein generating the plurality of features further comprises:
dividing the picture into a second grid of second picture regions that are smaller than the downsampled picture regions; and
determining a second intra prediction distortion value for each of the second picture regions, wherein the feature vector further comprise the second intra prediction distortion values.

14. The non-transitory machine readable medium of claim 12, wherein the feature vector further comprises pixel value ranges for each of the downsampled picture regions.

15. The non-transitory machine readable medium of claim 12, wherein said intra prediction comprises a limited intra prediction using only a subset of intra prediction modes available during said encoding of the picture, wherein the subset consists of only DC, vertical, and horizontal prediction modes.

16. The method of claim 1, wherein the machine learning engine comprises a neural network trained using a training corpus mapping that maps a plurality of training video picture features and target bitrate combinations to corresponding quantization parameters, the training corpus mapping generated by:
performing constant quantization parameter encode of each of a plurality of training video pictures at each of a plurality of training quantization parameters to generate a resultant bitrate for each combination of training video picture and training quantization parameter;
extracting a second plurality of features for each of the plurality of training video pictures; and
generating the training corpus mapping as a mapping between each combination of second plurality of features and resultant bitrate to a corresponding training quantization parameter.

17. The method of claim 16, wherein the constant quantization parameter encode and the encoding of the picture are performed using a same standards compliant encode and wherein the second plurality of features and the plurality of features comprise same feature types.

18. The method of claim 17, wherein said performing constant quantization parameter encode comprises performing the constant quantization parameter encode at each quantization parameter available in accordance with the standards compliant encode.

19. The system of claim 8, wherein the machine learning engine comprises a neural network trained using a training corpus mapping that maps a plurality of training video picture features and target bitrate combinations to corresponding quantization parameters, the training corpus mapping generated by:
performance of constant quantization parameter encode of each of a plurality of training video pictures at each of a plurality of training quantization parameters to generate a resultant bitrate for each combination of training video picture and training quantization parameter;

extraction of a second plurality of features for each of the plurality of training video pictures; and generation of the training corpus mapping as a mapping between each combination of second plurality of features and resultant bitrate to a corresponding training quantization parameter.

20. The system of claim 19, wherein the constant quantization parameter encode and the encode of the picture are performed using a same standards compliant encode and wherein the second plurality of features and the plurality of features comprise same feature types.

21. The non-transitory machine readable medium of claim 12, wherein the machine learning engine comprises a neural network trained using a training corpus mapping that maps a plurality of training video picture features and target bitrate combinations to corresponding quantization parameters, the training corpus mapping generated by:

performing constant quantization parameter encode of each of a plurality of training video pictures at each of a plurality of training quantization parameters to generate a resultant bitrate for each combination of training video picture and training quantization parameter;

extracting a second plurality of features for each of the plurality of training video pictures; and generating the training corpus mapping as a mapping between each combination of second plurality of features and resultant bitrate to a corresponding training quantization parameter.

22. The non-transitory machine readable medium of claim 21, wherein the constant quantization parameter encode and the encoding of the picture are performed using a same standards compliant encode and wherein the second plurality of features and the plurality of features comprise same feature types.

\* \* \* \* \*